April 6, 1926.  
P. F. SONNEK  
MEANS FOR TESTING THE COMPRESSION OF ENGINE CYLINDERS  
Filed Sept. 28, 1922  
1,579,789

INVENTOR

Patented Apr. 6, 1926.

1,579,789

UNITED STATES PATENT OFFICE.

PIERRE FRANK SONNEK, OF WOODHAVEN, NEW YORK.

MEANS FOR TESTING THE COMPRESSION OF ENGINE CYLINDERS.

Application filed September 28, 1922. Serial No. 591,007.

*To all whom it may concern:*

Be it known that I, PIERRE FRANK SONNEK, a citizen of the United States, residing at Woodhaven, in the county of Queens and State of New York, have invented certain new and useful Improvements in Means for Testing the Compression of Engine Cylinders, of which the following is a full, clear, and exact description.

The present invention relates to improvements in testing devices and is more especially directed to the provision of a device whereby the compression in the cylinders of an internal combustion engine or the like may be quickly and accurately ascertained.

It is well known that there are various forms of so-called compression testers or gauges for internal combustion and other engines which generally embody a gauge of the clock type. The use of these gauges is largely confined to laboratories and the larger manufacturing plants by reason of their cost, the labor involved in installation and the fact that they must be handled by relatively skilled mechanics in order to obtain satisfactory results.

While it is desirable in all engines to make regular and frequent tests for cylinder compression, it is especially so in internal combustion engines, particularly in those employed in motor vehicles. This, however, is not the present practice, owing to the reasons heretofore pointed out. In those cases where it is desired or necessary to learn the compression of the engine cylinders, it is customary for the operator to revolve the crank shaft by means of the hand crank, the effective compression of a given cylinder being estimated by the resistance offered in the revolution of the crank shaft. Frequently, the operator, being unaware of the ratio of speed of the cam shaft to that of the crank shaft will give the crank shaft but one revolution, and, the valves being open and the crank shaft revolving with little effort, he will decide that the compression is substantially nil. Obviously, this is a most unsatisfactory method of ascertaining the compression of a motor, and, where the so-called test is performed by a novice or an unscrupulous mechanic, the engine owner is many times put to an unnecessary outlay in having the engine overhauled.

Engine and motor vehicle builders are at all times prepared to furnish information relative to the proper amount of compression measured in pounds which should be maintained in the cylinders of the engines which they build to obtain the highest efficiency in performance, and it is evident that the provision of simple and efficient means for enabling the unskilled or non-technical person to make compression tests from time to time will not only increase the durability of the engines but will enable the user to obtain that degree of efficiency in performance for which the engines are designed.

The general object of the present invention is to provide a simple means whereby the average motorist or unskilled mechanic may accurately measure or test the compression of an engine cylinder with the expenditure of a minimum amount of time and effort.

A further object of my invention is to provide a device which can be economically produced and sold, whereby standard types of so-called tire pressure gauges or indicators or the usual compression testers may be satisfactorily utilized for carrying out the general object of my invention.

The invention further comprehends a device which may be quickly connected to the engine cylinder which is to be tested for compression, so as to communicate with the interior thereof and enable the user to obtain a visual indication of the compression measured in pounds by any of the various types of gauges or indicators which may be detachably connected to said device.

Other objects and advantages of my invention will become apparent as the description proceeds, and I will have it understood that I reserve unto myself all rights to the full range of equivalents, both in structure and uses, to which I am entitled under my invention in its broadest aspect.

For the purposes of the present disclosure, I have elected to describe certain embodiments of my invention, although it will be manifest that my invention may take other forms to meet specific requirements without departing from the spirit and scope of my invention in the appended claims.

Figure 1:
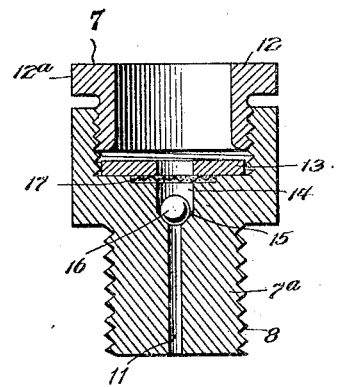
Fig. 1 is a sectional elevation of a device made in accordance with my invention.

Referring now to the drawings in detail, in which like characters of reference are employed to designate similar parts in the several views, 7 indicates the body member of the device, the lower end 7ª of which is reduced and externally threaded, as shown at 8, to engage the complemental threads 9 of the usual spark plug bore of the engine. As will be observed, the lower end 7ª of said body member is provided with a centrally located passageway or bore 11 which communicates with the enlarged interior of the head of the body member 7, the said head member being internally threaded to receive the externally threaded bushing 12.

The exterior of the head of the body member 7 is preferably of a hexagonal configuration, so that a wrench or other tool may be applied thereto, if desired, to properly seat the dependent portion 7ª in the spark plug bore.

The interior of the head of the body member 7 may be of a diameter to receive the lower end of a tire pressure gauge or indicator of any conventional type. The lower end or base of the indicator or its support abuts upon the gasket or washer 13, and the indicator is firmly locked in position within the head of the body member 7 by the bushing 12, which is formed to pass freely over the periphery of the indicator to engage the internal threads of the body member. The flange 12ª of the bushing 12 is preferably knurled to afford a finger grip, so that the bushing may be seated within the body member without the employment of a wrench or other tool. The bushing 12, when seated in the head of the body member will serve to maintain the indicator in close contact with the washer or gasket 13, thereby providing an hermetic joint between the device and the pressure indicator.

As will be noted, the bore 11 of the device within the dependent portion 7ª is of a reduced diameter, the upper end thereof being enlarged, as shown at 14, and formed with a seat 15 for the ball valve 16. The upper end of the chamber 14 is preferably covered with a disk or piece of foraminous material, as shown at 17, which may be countersunk in the upper surface of the base of the head of the body member 7.

From the foregoing description of the device, it will be obvious that when the pressure gage is mounted therein, by means of the bushing 12, and the dependent threaded portion 7ª seated within the spark plug bore, that a means of communication between the combustion chamber of the engine cylinder and the indicator is established. Therefore, when the crank shaft of the engine is rotated, either by hand or by means of the usual electric starter, the compression built up within the cylinder under test will unseat the ball valve, the pressure escaping through the device functioning the indicating element of the gage. Where the latter is of the type wherein the indicating element remains in indicating position only in response to the pressure, it will be apparent that the seating of the ball valve 16 when the cylinder pressure is exhausted will trap the air which has passed through the chamber 14, the indicating element of the gage being thereby retained in indicating position for observation or reading.

Figure 2:
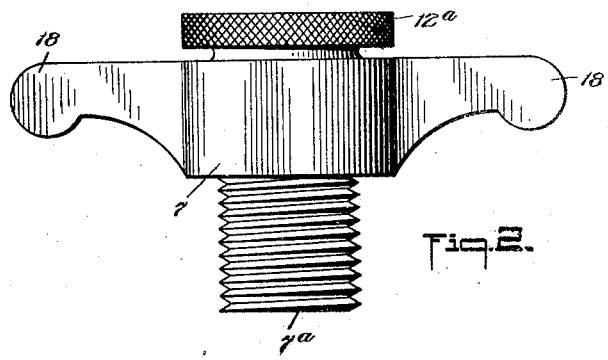
Figure 2 is a modified form of the device.

In Fig. 2, the head of the body member 7, instead of being of a hexagonal shape, as heretofore described, is provided with wings 18, so that it may be "hand tightened" in the spark plug bore of the engine.

From the foregoing description, it will be seen that I have devised an adapter which increases the field of utility of a tire pressure gauge and renders it possible for the average motorist and non-technical man to obtain accurate readings of the compression of his engine cylinders as frequently as may be desired. The construction of the adapter permits of the location of the pressure gauge therein in functioning position without the employment of tools, and a test for compression may be quickly made by the simple expedient of removing a spark plug and screwing the dependent threaded portion of the adapter into the spark plug bore. No adjustments of the indicating device are required to permit of its use as a compression tester, nor is it necessary to employ reducers and other media in order to connect the indicating device to the engine, as is frequently the case where compression testers of the laboratory type are used. In those cases where it may be desired to employ the latter form of testing devices, the bushing 12 may be internally threaded to receive the nipple end of the compression tester. It will be obvious, of course, that the internal threading of the bushing 12 adds to the range of usefulness of the adapter, as an adapter thus formed may still be used in conjunction with tire pressure gauges in the manner heretofore explained.

I claim:

1. A device for supporting a tire pressure indicator in communication with the interior of an engine cylinder, comprising a member having a central bore adapted for threaded engagement with the spark plug bore of the engine cylinder, said member being formed with a seat for a tire pressure indicator, a gasket positioned on said seat, a bushing adapted to be threaded into said member to engage the base of the tire pressure indicator and press the same into close contact with said gasket to form an hermetic joint between said member and said indicator and a valve located within the bore of said member.

2. A device for connecting pressure indicators to the cylinders of internal combustion engines, comprising a member having a reduced dependent threaded portion, a bore centrally located in said member and formed with a valve seat intermediate of its ends, a valve in said bore and a bushing adapted for threaded engagement with the upper end of said member for securing a pressure indicator in position within said member.

3. A device for connecting a pressure indicator to a cylinder of an internal combustion engine comprising a member having an externally threaded dependent portion, a bore centrally disposed within said member, said bore being provided with a valve seat, a valve cooperatively associated with said seat and means detachably connected to said member for supporting a pressure indicator in communication with said bore.

4. A device for connecting a pressure indicator to the cylinder of an internal combustion engine comprising a member having an integrally formed externally threaded dependent portion provided with a centrally located bore formed with a valve seat intermediate of its ends, a valve cooperatively associated with said seat, a bushing adapted for threaded engagement with the interior of the body operation of said member, a gasket located within said body portion and a perforate element interposed between said gasket and the adjacent end of said bore.

PIERRE FRANK SONNEK.